Jan. 29, 1946.　　F. KOWALSKI, JR　　2,393,642
TANK CARRIER
Filed May 6, 1943
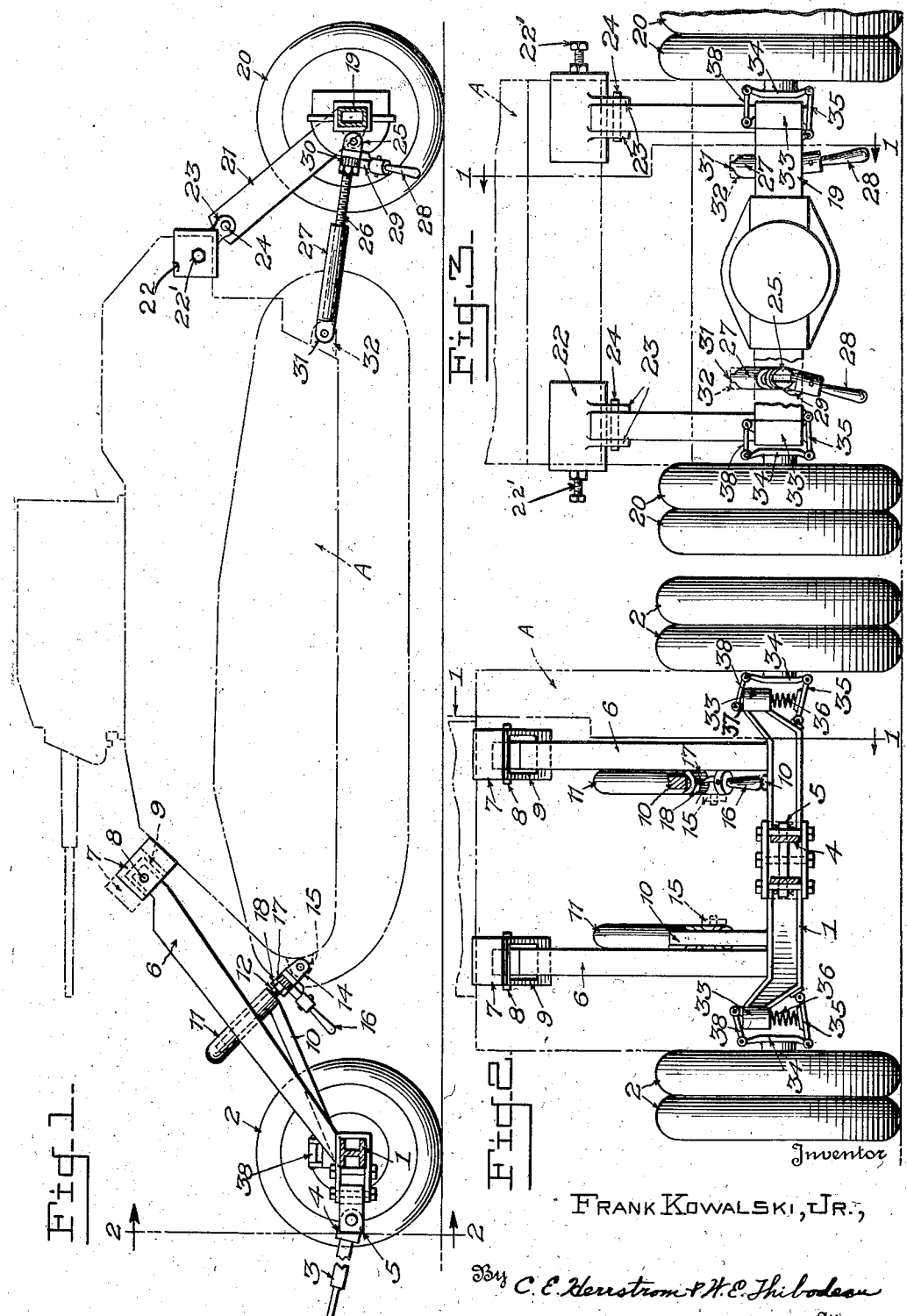
Inventor
Frank Kowalski, Jr.,
By C. E. Herrstrom & W. E. Thibodeau
Attorneys Patented Jan. 29, 1946

2,393,642

UNITED STATES PATENT OFFICE 2,393,642

TANK CARRIER

Frank Kowalski, Jr., Freda, Calif.

Application May 6, 1943, Serial No. 485,838

1 Claim. (Cl. 280—29)

(Granted under the act of March 3, 1883, as amended April 30, 1928; 370 O. G. 757)

The invention described herein may be manufactured and used by or for the Government for governmental purposes, without the payment to me of any royalty thereon.

The present invention pertains to a carrier for heavy loads such as combat tanks and consists of improvements in the tank carrier disclosed in my copending application entitled Tank carrier, Serial No. 476,301, filed February 18, 1943. The carrier described herein resembles my earlier device in that it is a wheeled structure from which the tank is suspended, as distinguished from the usual flat truck or trailer on which the disabled tank is ordinarily mounted to be wheeled away.

The carrier herein disclosed, like that shown in the earlier application, comprises front and rear wheel units between which the tank is suspended. One of the improvements is the provision of attachments enabling a given carrier to be used with various types of tank hulls. Another improvement is the provision of a spring suspension, such as a knee action, on the carrier units so that the heavy load carried by the device will not be entirely unsprung.

Another important object of the invention is to enable lifting the disabled tank from a surface that is not level. In the accomplishment of this object the front and rear carrier units are provided each with a pair of jacks with jack screws adapted to be fastened to the tank. Thus, any irregularities in the ground surface under the disabled tank and carrier units are compensated by merely adjusting the jack screws. When the latter are screwed up, the tank is lifted off the ground.

The invention is fully disclosed in the following description and in the accompanying drawing in which:

Figure 1 is a side elevation of the device, with parts in section on the line 1—1 of Figures 2 and 3;

Figure 2 is a front end view on the line 2—2 of Figure 1; and

Figure 3 is a rear end view.

Reference to these views will now be made by use of like characters which are employed to designate corresponding parts throughout.

The carrier consists of a front unit and a rear unit which, when not carrying a load, can be fastened together and in this condition wheeled to the disabled tank A. They are then detached from each other and applied respectively to the ends of the tank.

The forward unit comprises a wheeled axle 1 carrying tires 2 of suitable size and number, as determined by the maximum load for which the device is intended to be used. A draft bar 3 is attached to the axle 1 by any suitable means such as a fork 4 and a swivel connection 5.

The load carrying structure includes a pair of struts 6 fixed to the axle and extending angularly upward therefrom. On the upper end of each strut is rotatably mounted a shoe or block 7 held by a removable transverse pin 8. The block has greater thickness on one side of the pin than on the other in order that it may selectively present lower surfaces at two unequal distances from the pin on rotating the block 180 degrees after removal of the pin, for a purpose that will presently be described. Also, the socket 9 in the block for receiving the upper end of the strut 6 is slightly oversized to permit the block to rock somewhat on the pin.

A pair of auxiliary struts 10 extend from the axle 1 in a manner to form a vertical angle with each of the main struts 6. Each pair of struts 6, 10 carries an internally threaded jack cylinder 11 in which is mounted a jack screw 12 protruding through the lower end. In this connection it is noted that the open end of the cylinder is disposed downwardly, the cylinder being shown mounted at an angle of about 45 degrees, although it may approach a vertical position. The lower end of the jack screw carries an ear 14 adapted to be pinned to the towing eye 15 of the tank A. The jack is operated in the usual manner by a pawl lever 16 rotatably mounted on a blank portion of the screw 12 and engageable with a ratchet 17 fixed on the screw by a nut 18. The axle 1, struts 6, auxiliary struts 10 and wheels 2 constitute a wheeled frame.

The rear carrier unit similarly comprises a wheeled axle 19 with tires 20 and a pair of struts 21 extending angularly upward from the axle. These members likewise constitute a wheeled frame. The upper end of each strut carries a box-like seat 22 held by an external lug 23 attached with a pivot pin 24. A lock screw device 22' is mounted in each seat 22 to be tightened and locked against a side of the tank A. To the axle 19 is pivotally attached a gear or socket member 25 in which is rotatably mounted one end of a jack screw 26. The screw works in a jack cylinder 27 similar to the member 11 previously described. Likewise, the screw is operated from a lever 28 rotatably mounted on a blank portion of the screw and carrying a pawl 29 engageable with a ratchet wheel 30 fixed on the screw. The free or closed end of the jack cylinder is apertured transversely at 31 to be pinned to one of the rear towing eyes 32 on the tank. Each unit carries two such jack assemblies, one for each side of the load.

With the carrier units applied to the tank in the manner described, the shoes 7 of the forward unit rest on the sloping front of the tank and the seats 22 receive the rear corners as shown in Figures 1 and 3. At the forward end the shoes 7 may be adjusted to either of two positions, one of which is shown in dot-dash lines to conform with the slope of the forward wall of the tank. In addition, some accommodation occurs in the swivel mountings of the shoe on the pin 8, as previously stated.

As the forward jack screws 12 are turned into their cylinders 11, with the tires 2 resting on the ground, the shortening of the jacks will raise the forward end of the tank at the eyes 15. At the rear end, the shortening of the jack tends to swing the strut 21 forward and downward about the pins 24 as centers, but since such movement is not possible because of the tires 20 resting on the ground, the rear end of the tank will be elevated.

Each of the axles is provided with a suitable spring suspension, preferably of the knee action type. This may be conventional as shown and comprise a cylinder 33 carried by each end of the axle. A plate 34 is fastened to the inner side of the adjacent wheel and has its lower end joined by a horizontal plate 35 to the lower edge of the axle, the plate 35 being hinged to both parts. On the plate 35 is mounted a coil spring 36 extending into the cylinder 33 through the open bottom thereof and bearing against the closed top 37 of the cylinder. The upper end of the plate 34 is joined to an upper portion of the axle by a short plate 38 hingedly attached to both parts.

When not carrying a load, the units are fastened together in any suitable manner and towed to the disabled tank. For example, the front and rear units of Figures 1, 2 and 3 may be pinned together at the upper ends of the props as in the aforementioned copending application. When carrying a load in the manner described, the tank itself provides the chassis between the two axles. The provision of additional towing eyes or other fastening elements on the ends of the tank would enable a given pair of carrier units to be applied to a greater variety of tank designs. Each unit may be equipped with suitable air brakes and other accessories as desired.

Although specific embodiments of the invention have been illustrated and described, it will be understood that various alterations in the details of construction may be made without departing from the scope of the invention as indicated by the appended claim.

What I claim is:

A carrier for a combat tank, comprising a pair of wheeled axles, one of which is adapted to be disposed in front of said tank while the other wheeled axle of the pair is adapted to be disposed in the rear of said tank, a draft member for towing the carrier, a pivotal connection between said draft member and said one of said axles and spaced forwardly of the axis of said one of said axles and adapted normally to be disposed substantially in a plane including the axes of said axles, a pair of structural members affixed to said one of said axles and extending upwardly and rearwardly therefrom at an acute angle to said plane when said pivotal connection is disposed substantially therein, a transversely slidable pin carried at the upper end of each of said structural members, a multiple face shoe disposed at the upper end of each of said structural members and adapted to bear against a forwardly front surface of a tank hull, means for supporting said shoe on said pin for selectively presenting different faces of the shoe to the tank hull at different distances from said pin, a pair of auxiliary struts affixed to said one of said axles and extending upwardly and rearwardly therefrom at an angle included in said acute angle made with said plane by said structural members, power means carried by said struts for connection to the tank hull for raising and holding the latter, a second pair of structural members affixed to the other of said pair of axles and extending upwardly and forwardly therefrom at an acute angle to said plane, a seat mounted to pivot on the upper end of each of the latter structural members for receiving an angular upper portion of the tank hull, and power means for drawing said other of said axles toward the lower portion of the tank hull for raising and supporting the rear of the tank above the ground.

FRANK KOWALSKI, Jr.